COMBINED UNIT OF IMPEDANCE

Filed April 17, 1962 2 Sheets-Sheet 1

INVENTORS
MITSUO MATSUSHIMA &
SHIGEAKI OGAWA
BY Blum, Moscovitz, Friedman and Blum
ATTORNEYS INVENTORS
MITSUO MATSUSHIMA &
SHIGEAKI OGAWA
BY Blum, Moscovitz, Friedman and Blum
ATTORNEYS United States Patent Office 3,295,056
Patented Dec. 27, 1966

3,295,056

COMBINED UNIT OF IMPEDANCE

Mitsuo Matsushima and Shigeaki Ogawa, both of Akita-ken, Japan, assignors to Tokyo Denki Kagaku Kogyo Kabushiki Kaisha, Tokyo, Japan Filed Apr. 17, 1962, Ser. No. 188,174
Claims priority, application Japan, Apr. 28, 1961, 36/20,813, 36/20,814, 36/20,815
3 Claims. (Cl. 323—78)

This invention relates to a compact impendance device or unit including two campactly arranged and interconnected impedance components.

The present invention presents a combined unit of a coil and a condenser suitable for use with detection filters in an electronic apparatus or the like such as television receivers.

The present invention also presents a $\pi$ type connection combined unit consisting of a coil and two condensers, which is suitable for use with detection filters in an electronic apparatus or the like such as television receivers.

The present invention further relates to the structure of LR parallel combined units for peaking coils to be utilized in some wide band amplification circuits such as those in television receivers or the like.

In peaking coils of the conventional types, their component coils and resistors are connected in parallel or in a form in which the coil is wound around the resistor used as its bobbin. Therefore, in the former of the above mentioned conventional examples, the parts necessarily occupy an unduly large space as well as requiring many brazing operations, while in the latter case it is difficult to secure the required amount of inductance L. Thus either of the conventional utilizations involves inherent disadvantages in their performances. In order to overcome such disadvantages, the present invention provides a ferrite core with some resistor substance.

For an understanding of the principles of the invention, reference is made to the following description of typical embodiments thereof as illustrated in the accompanying drawings. In the drawings.

Figure 1:
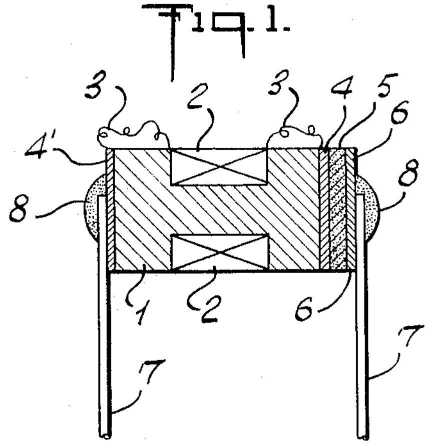
FIGS 1 and 2 are longitudinal sectional views through one embodiment of an impedance unit in accordance with the invention, and respectively illustrating a series connection of the impedance components and a parallel connection thereof.
Figure 2:
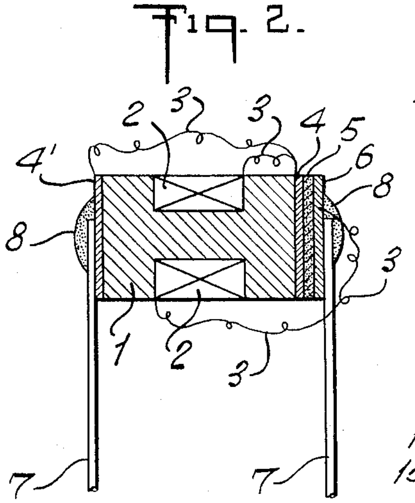

Referring to FIGS. 1 and 2, the impedance unit of the invention is illustrated as including a ferrite core 1 which is a generally cylindrical one-piece core having a circumferentially extending radial recess intermediate a pair of enlarged ends and receiving a winding 2 having end leads 3. Both ends of core 1 are provided with metallic electrodes 4 and 4' of silver or the like. A porcelain dielectric 5 is bonded to the electrode 4, and a condenser electrode 6 is plated or bonded to the outer surface of dielectric 5 to form, with electrode 4, a condenser.

Thereafter leads or terminals 7 are brazed on the silver electrode 4' and electrode 6, thereby completing the invented unit. The bonding of the ferrite core 1 with the porcelain dielectric 5 can be carried out by either the adhesion of a suitable conductive bonding agent, a mechanical press-and-bind method, or molding with some thermoplastic resin.

In the case when the combined impedance unit is to be used with its impedance components in a series connection, one lead wire 3 of the coil 2 will be connected, as shown in FIGURE 1, with the silver electrode 4' and the other lead 3 with the silver electrode 4. In the case when the unit is to be used with its components in parallel connection, the coil leads 3 will be connected, as shown in FIGURE 2, with the silver electrode 4 and electrode 6, respectively, and said pair of silver electrodes 4 and 4' are interconnected with each other.

What is strongly demanded in the field of electronic apparatus industries at the present time is the miniaturization of circuit components without sacrificing their capability. In detection coils of conventional types, however, the required units have been provided by combining a coil of predetermined capacity with a condenser through some supports, with the result that an unduly large space is occupied by these components besides requiring many brazing operations, in addition to decreasing the resistance to mechanical vibrations and other shocks.

The present invention, in the preferred embodiment thereof, largely overcomes these prior art limitations by providing a cylindrical ferrite core having a circumferentially extending radial recess with a winding disposed therein and including capacitor plates directly connected to the end portions of the ferrite core to thereby achieve both compactness and improved electrical performance characteristics. Thus, a typical combined impedance unit constructed in accordance with the principles of the present invention, has an inductance from 10–200 microhenries and a capacitance ranging from 5–20 microfarads, while keeping its overall dimensions to approximately 10 millimeters by 5 millimeters. As a result of the novel construction the length of the lead wires interconnecting the individual impedance elements in the combined unit is greately reduced, which, together with the utilization of the ferrite core effects a substantial reduction in the distributed capacitance present in the unit.

Figure 4:
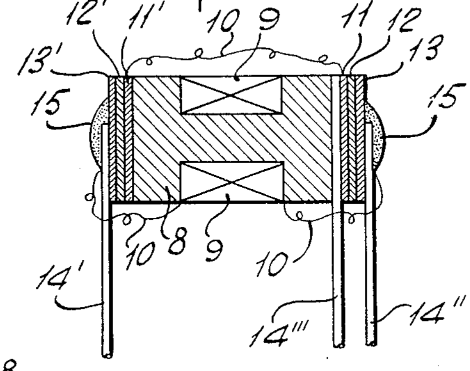
FIG 4 is a view, similar to FIGS 1 and 2, illustrating another embodiment of the impedance unit in accordance with the invention.
Figure 5:
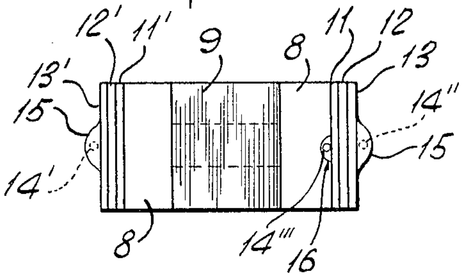
FIG. 5 is a plan view of the unit shown in FIG. 4.
Figure 6:
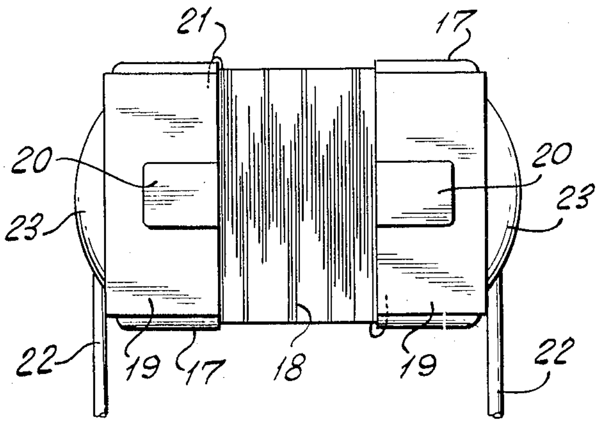
FIG. 6 is a side elevational view of another embodiment of impedance unit in accordance with the invention.
Figure 7:
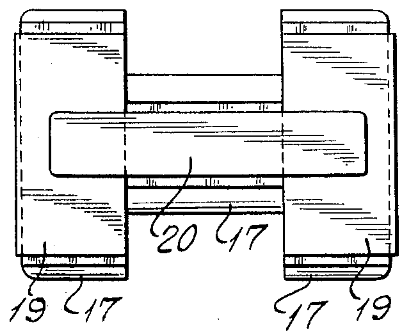
FIG. 7 is a side elevational view of the unit shown in FIG. 6, with the winding and the terminal leads removed.
Figure 8:
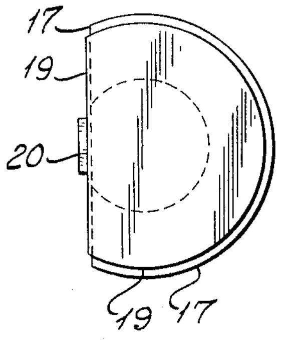
FIG. 8 is an end elevational view looking from the right end of FIG. 7.
Figure 9:
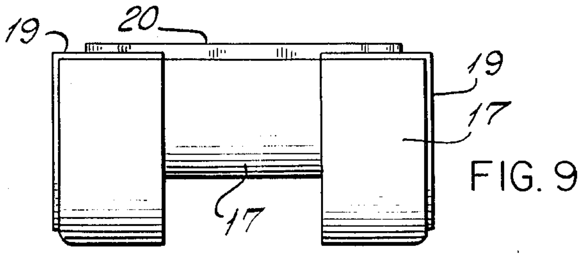
FIG. 9 is a plan view corresponding to FIG. 7.

In the embodiment illustrated in FIGURES 4 and 5, the end surface of the ferrite core 8, around which the coil 9 is wound, is notched at 16, both end surfaces of the core 8 being plated with metallic electrodes 11 and 11' of silver or the like. Then, said silver electrodes 11 and 11' are bonded with the porcelain dielectrics 12 and 12' in turn bonded to condenser electrodes 13 and 13' to build up a pair of condensers.

In the unit of FIGS. 4 and 5, lead terminals 14' and 14'' are connected with electrodes 13' and 13, respectively, as illustrated at 15, and the lead terminal 14''' is inserted into notch 16 of the ferrite core 8 and fixed therein.

Figure 3:
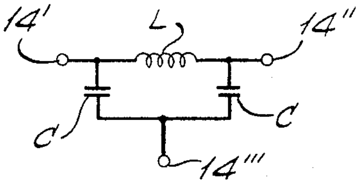
FIG. 3 is a schematic wiring diagram illustrating the electrical components of the impendance unit shown in FIGS. 4 and 5.

Then, the lead wires 10 of the coil 9 are connected with electrodes 13 and 13', through terminals 14' and 14'', and the pair of silver electrodes 11 and 11' are interconnected with each other, so that a combined unit whose equivalent circuit is shown in FIGURE 3 may be formed.

The bonding between the ferrite core 8, provided with silver electrodes 11 and 11', and the porcelain dielectrics 12 and 12', provided with the electrodes 13 and 13', may be accomplished by either adhesion with a conductive binding agent, a mechanical press-and-bind process, or molding with some thermoplastic resin.

In the unit of FIGS. 4 and 5, a condenser is directly mounted on and connected with a ferrite core 8 with an outer lead terminal, minimizing its size to such an extent as to provide an excellently miniatured model measuring 12 mm. x 5 mm. when its inductive characteristic L is 10–200 $\mu$h. and its capacitive characteristic C is 5–20 $\mu$f. In addition, the lead terminals are orderly gathered into three, resulting in the practical merit of less points of connection for the installation of the unit.

In the embodiment illustrated in FIGURES 6 through 9, metallic electrodes 19 of silver or the like are plated over each end surface of ferrite core 17 having the shape of a truncated dumbbell, resistor substance 20 consisting of carbon film or the like is provided between the said pair of electrodes, coil 18 is wound in the central recess of the ferrite core. Coil leads 21 and resistance electrodes 19 are connected together at terminals 23 by each being brazed to terminals 23 to form a parallel connected arrangement of resistance and inductance. Leads 22 are brazed to terminals 23 and are thus adaptable to connect the respective junctions of the resistance and inductance components to an electrical circuit.

As previously described, in the invention unit, a resistor substance is painted, dried and plated over the cut plane of the dumbbell shaped magnetic core at its notched portion to form a unitary resistor and cored inductor having a greatly reduced overall size.

Furthermore, the use of a dumbbell shaped ferrite core serves to increase the effective value of $\mu$, so that the required inductance can be obtained with fewer turns of the coil, and the distributed capacity is advantageously reduced.

What we claim is:

1. A compact impedance device comprising, in combination a generally cylindrical one-piece ferrite core having a circumferentially extending radial recess intermediate a pair of enlarged ends; layers of relatively low resistance electrically conductive metal each disposed on a respective end of said core, a pair of terminals each electrically connected to a respective one of said layers, a coil winding disposed in said recess having its ends respectively connected to said pair of terminals, said coil winding constituting a first impedance component, a conductor of high resistance material including at least one of said layers constituting a second impedance component, and conductive leads respectively connected to said pair of terminals.

2. A compact impedance device comprising, in combination a generally cylindrical one-piece ferrite core having a circumferentially extending radial recess intermediate a pair of enlarged ends; layers of relatively low resistance electrically conductive metal each disposed on a respective end of said core, a pair of terminals each electrically connected to a respective one of said layers, a coil winding disposed in said recess having its ends respectively connected to said pair of terminals, said coil winding constituting a first impedance component, a conductor of high resistance material including at least one of said layers constituting a second impedance component, said conductor having a longitudinal shape and being connected at each end to a respective one of said low resistance layers, and conductive leads respectively connected to said pair of terminals.

3. A compact impedance device, comprising, in combination, a one-piece ferrite core in the form of a truncated dumbbell, truncated in a plane parallel but radially spaced from its axis to provide a plane surface; the truncated dumbbell shape of said core providing a core having a circumferentially extending radial recess intermediate a pair of enlarged ends; layers of relatively low resistance electrically conductive metal each applied in electrical connection with the end surface of each enlarged end and extending over the plane surface of each enlarged end; a layer of high electrical resistance metal extending over said plane surface and in electrical connection with each of said layers of relatively low resistance electrically conductive metal; a winding disposed in said recess and embracing the intermediate portion of said layer of high resistance metal between said enlarged ends, said winding constituting a first impedance component; a pair of terminal leads each electrically connected at one end to that portion of a respective one of said layers of relatively low resistance electrically conductive metal in electrical contact with the end surface of the associated enlarged end; and means electrically connecting opposite ends of said winding to respective layers of said relatively low resistance electrically conductive metal; whereby, said layer of high electrical resistance metal constitutes a second impedance component connected in parallel circuit relation with said first impedance component.

References Cited by the Examiner

UNITED STATES PATENTS

| | | | |
|---|---|---|---|
| 2,111,710 | 3/1938 | Vanloon | 333—79 |
| 2,163,775 | 6/1939 | Conklin | 333—79 |
| 2,403,349 | 7/1946 | Dolberg | 336—136 X |
| 2,464,376 | 3/1949 | Cohen et al. | 323—74 X |
| 2,637,777 | 5/1953 | Kilby et al. | 323—74 |
| 2,940,035 | 6/1960 | Lefkowitz | 323—74 |
| 3,076,947 | 2/1963 | Davidson | 333—79 |
| 3,176,217 | 3/1965 | Matsushima et al. | 323—78 |

JOHN F. COUCH, *Primary Examiner.*

LLOYD McCOLLUM, *Examiner.*

A. D. PELLINEN, *Assistant Examiner.*